United States Patent
Oude Grotebevelsborg

(10) Patent No.: US 10,160,011 B2
(45) Date of Patent: Dec. 25, 2018

(54) METHOD AND DEVICE FOR SEPARATING PARTICLES OF PLASTIC FOIL AND PARTICLES OF ORGANIC MATERIAL

(71) Applicant: D TECHNOLOGIES HOLDING B.V., Oldenzaal (NL)

(72) Inventor: Willem Jan Oude Grotebevelsborg, Ootmarsum (NL)

(73) Assignee: Anaergia B.V., Oldenzaal (NL)

( * ) Notice: Subject to any disclaimer, the term of this patent is extended or adjusted under 35 U.S.C. 154(b) by 0 days.

(21) Appl. No.: 15/026,355

(22) PCT Filed: Sep. 15, 2014

(86) PCT No.: PCT/NL2014/000030
§ 371 (c)(1),
(2) Date: Mar. 31, 2016

(87) PCT Pub. No.: WO2015/050433
PCT Pub. Date: Apr. 9, 2015

(65) Prior Publication Data
US 2016/0221040 A1    Aug. 4, 2016

(30) Foreign Application Priority Data
Oct. 2, 2013    (NL) ..................... 1040425

(51) Int. Cl.
*B07B 9/00*    (2006.01)
*B07B 4/08*    (2006.01)
(Continued)

(52) U.S. Cl.
CPC .................. *B07B 4/08* (2013.01); *B07B 1/20* (2013.01); *B07B 1/528* (2013.01); *B07B 4/00* (2013.01);
(Continued)

(58) Field of Classification Search
CPC .. B07B 1/20; B07B 1/528; B07B 4/00; B07B 4/08; B07B 7/04; B07B 7/08;
(Continued)

(56) References Cited

U.S. PATENT DOCUMENTS 2,793,847 A * 5/1957 Steele ................... B01D 45/14
209/303
4,106,705 A    8/1978 Nakamura
(Continued)

FOREIGN PATENT DOCUMENTS

CH    620859 A5 * 12/1980 ........... B01D 29/118
CN    2072442 U    3/1991
(Continued)

OTHER PUBLICATIONS

English Translation of CH 620859 A5 (INV: Nakamura, Kensaku; Pub. Date: Dec. 1980).*
(Continued)

*Primary Examiner* — Joseph C Rodriguez

(57) ABSTRACT

A method and device are used for separating particles of plastic foil from organic material. The device includes a chamber with a perforated wall. A mixture of particles of plastic foil and organic material is fed into the chamber through a feed opening. The mixture is set into a rotating movement inside the chamber by a rotor. In the vicinity of the perforations, the centrifugal force to which a particle is subjected is at least fifty times greater than the gravitational force to which the particle is subjected. An airflow is generated in the chamber parallel to the rotational axis of the rotor. Particles of organic material leave the chamber through the perforations. Particles of plastic foil are carried along by the first airflow and then discharge through an opening in the chamber.

11 Claims, 2 Drawing Sheets

(51) Int. Cl.
  *B07B 1/20* (2006.01)
  *B07B 1/52* (2006.01)
  *B07B 4/00* (2006.01)
  *B29B 17/02* (2006.01)
  *B29L 7/00* (2006.01)

(52) U.S. Cl.
  CPC ...... *B29B 17/02* (2013.01); *B29B 2017/0231* (2013.01); *B29L 2007/008* (2013.01); *Y02W 30/622* (2015.05)

(58) Field of Classification Search
  CPC .. B07B 7/083; B07B 9/00; B07B 9/02; B07B 2200/02; B29B 2017/0227; B29B 2017/2031
  See application file for complete search history.

(56) References Cited

U.S. PATENT DOCUMENTS

| | | | | |
|---|---|---|---|---|
| 4,245,999 | A | * | 1/1981 | Reiniger .................. B02C 13/14 209/17 |
| 4,287,058 | A | | 9/1981 | Larsen |
| 5,593,042 | A | * | 1/1997 | Keller ..................... B07B 1/20 209/261 |
| 5,758,778 | A | * | 6/1998 | Kershner ................ B07B 1/20 209/283 |
| 5,782,950 | A | | 7/1998 | Kanitz et al. |
| 5,890,664 | A | | 4/1999 | Conant, III |
| 6,110,727 | A | | 8/2000 | Widmer et al. |
| 6,270,025 | B1 | * | 8/2001 | Geigle ..................... B01J 2/20 241/24.1 |
| 7,097,044 | B2 | * | 8/2006 | Gutierrez ................ B03B 5/32 209/305 |
| 8,220,728 | B2 | * | 7/2012 | Eriksen ................... B02C 13/12 241/14 |
| 9,527,091 | B2 | * | 12/2016 | Corcoran ........... B01D 21/0012 |
| 9,551,108 | B2 | * | 1/2017 | Feng ..................... D21D 1/004 |
| 2008/0035561 | A1 | | 2/2008 | Gray |
| 2012/0010063 | A1 | * | 1/2012 | Levitt ................ B01D 17/0217 494/27 |
| 2013/0316428 | A1 | | 11/2013 | Gonella |
| 2014/0203120 | A1 | | 7/2014 | Gibis et al. |
| 2015/0076059 | A1 | | 3/2015 | Theodoulou et al. |
| 2015/0314486 | A1 | * | 11/2015 | Hayashi ................ B29B 17/02 241/19 |
| 2015/0343357 | A1 | | 12/2015 | Olsson |
| 2016/0207806 | A1 | * | 7/2016 | Oude Grotebevelsborg ............... C02F 3/28 |
| 2016/0339478 | A1 | * | 11/2016 | Tsai .......................... B07B 4/08 |

FOREIGN PATENT DOCUMENTS

| | | |
|---|---|---|
| CN | 1105502 A | 7/1995 |
| CN | 201135965 Y | 10/2008 |
| CN | 102374761 A | 3/2012 |
| DE | 19616623 B4 | 12/2004 |
| EP | 0359250 A2 | 3/1990 |
| EP | 1207040 A2 | 5/2002 |
| EP | 1215187 A2 | 6/2002 |
| EP | 1568478 A1 | 8/2005 |
| EP | 2006034 A2 | 12/2008 |
| GB | 2276339 A | 9/1994 |
| IT | TO20111068 A1 | 5/2013 |
| JP | 3666800 B2 | 6/2005 |
| WO | 2015050433 A1 | 4/2015 |
| WO | 2015053617 A1 | 4/2015 |

OTHER PUBLICATIONS

Chinese Patent Application No. 201480062244.0, Office Action dated Nov. 3, 2017—English Translation Available.
Chinese Patent Application No. CN201480062244.0, Office Action dated Apr. 5, 2017.
International Patent Application No. PCT/EP2016/053053, International Search Report and Written Opinion dated Jun. 29, 2016.
International Patent Application No. PCT/NL2014/000030, International Preliminary Report on Patentability dated Apr. 14, 2016.
International Patent Application No. PCT/NL2014/000030, International Search Report and Written Opinion dated Jan. 15, 2015.
U.S. Appl. No. 15/026,355, Non-Final Office Action dated May 30, 2017.
U.S. Appl. No. 15/026,355, Notice of Allowance dated Dec. 1, 2017.
U.S. Appl. No. 15/085,412, Restriction Requirement dated Oct. 20, 2017.
Chinese Patent Application No. 201480062244.0, Office Action dated May 22, 2018—English Translation Available.
U.S. Appl. No. 15/085,412, Non-Final Office Action dated Nov. 20, 2017.
U.S. Appl. No. 15/085,412, Final Office Action dated May 29, 2018.

* cited by examiner

METHOD AND DEVICE FOR SEPARATING PARTICLES OF PLASTIC FOIL AND PARTICLES OF ORGANIC MATERIAL

CROSS-REFERENCE TO RELATED APPLICATIONS

This application is a National Stage Entry of International Application No. PCT/NL2014/000030, filed Sep. 15, 2014, which claims priority to NL Application Serial No. 1040425, filed Oct. 2, 2013. International Application No. PCT/NL2014/000030 is incorporated by reference.

FIELD OF THE INVENTION

The invention relates to a method for mutually separating particles of plastic foil and particles of organic material. The invention also relates to a device for mutually separating such particles according to such a method.

BACKGROUND OF THE INVENTION

Household waste comprises a smaller or larger part of organic waste which can be processed by digestion. For this purpose the non-digestible parts such as metal, sand and glass, stone, plastic bottles and foil must first be removed. Many separating methods are known for this purpose, including shredding, pressing and screening. The remaining, substantially organic material can then be further comminuted. Cell walls will break here and a pasty material results comprising moisture and solid organic material. In addition to particles of pasty organic material, pieces of plastic foil which have not been removed from the waste during the preceding process steps, for instance because they have been able to pass through screen openings, will however usually also be present in the comminuted material. It is important to also remove these pieces of plastic foil before admitting the comminuted material into a digester since they can disrupt the digesting process.

Many methods and devices are known for mutually separating particles of different size, weight, mass density and/or shape. Use can thus be made here of gravitational force, mass inertia or centrifugal forces. Examples hereof can be found in patent documents classified within B01D (IPC). Use can also be made of a centrifuge comprising a drum or rotor. Examples hereof can be found within B04B (IPC). Also known is a cyclone: a device in which a more or less free vortex or swirling is created. Examples hereof can be found within B04C (IPC). It is further known to screen and divide particles according to size, by means of screens, grids and the like, or according to weight and/or size by means of gas or airflows, wherein gravitational force and/or air resistance play a part. Examples hereof can be found in patent documents classified within B07B (IPC).

US20090230224A1 thus describes a system for 'separating glass and plastic foils in laminated glass'. Use is made here of a drum with a rotor rotating therein provided with beaters with which the glass is broken into pieces. The heavier glass particles then fall downward and through perforations arranged in the underside of the drum. The lighter foil particles are carried along by an airflow generated by blades arranged on the rotor. Such a system is found to be unsuitable for separating pieces of plastic foil and particles of pasty organic material because an effective and sufficient separation thereof is not possible on the basis of gravitational force and air resistance. The perforations will also quickly become clogged and the yield will be minimal.

JP2002177888A describes a device for separating foreign matter from organic waste. Use is made here of a drum which is provided on the underside with perforations, and a rotor rotating in the drum and provided with vanes which slide along the inner side of the drum. Following introduction of the waste into the drum the waste is shredded and comminuted. The organic material drops to the underside of the drum and leaves the drum through the perforations there, assisted here by the vanes. Foreign materials are further carried away by an airflow. This system is also found to be unsuitable for separating pieces of plastic foil and particles of pasty organic material because an effective and sufficient separation thereof is not possible on the basis of gravitational force and air resistance. Here too the perforations will also become quickly clogged and the yield will be minimal.

Many other systems for mutually separating particles of different size, weight, mass density and/or shape are thus known. None of these known systems is however found to be suitable in practice for effective and sufficient mutual separation of said pieces of plastic foil and particles of pasty organic material. There is therefore a need for a solution here. The present invention now provides this.

SUMMARY OF THE INVENTION

The invention provides a method and device for separating particles of plastic foil and organic material. Particles of organic material are flung outward perpendicularly of the rotation axis of the rotor by the rapid rotating movement and the high centrifugal forces, and discharged through the perforations to the first discharge opening. With a correct size of the perforations and a sufficient velocity of the first airflow the lighter particles are not allowed through the perforations, or much less so, and are carried along by the first airflow parallel to the rotation axis of the rotor to the second discharge opening. A separation of the introduced mixture thus takes place. The terms 'parallel' and 'perpendicular' are understood in the context of the invention to mean 'at least substantially, on the whole, parallel and perpendicular'.

The first airflow can be generated by a number of first blades forming part of the rotor and placed obliquely of the rotation axis. Discharge of particles of plastic foil carried along by the first airflow through the second discharge opening can take place at least partially by means of a second airflow generated by a number of second blades forming part of the rotor and placed parallel to the rotation axis. The first airflow and the second airflow can thus be generated by the rotor and a separate fan/fans is/are not necessary, and the rotating movement and the totality of airflows are generated by the rotor alone. The rotor can further comprise third blades here for removing material present on a side of the wall facing toward the chamber, for which purpose the outer ends of the third blades are situated in the vicinity of this side of the wall.

BRIEF DESCRIPTION OF THE DRAWINGS

The invention is elucidated hereinbelow on the basis of non-limitative exemplary embodiments and accompanying drawings. More or less schematically in the drawings.

EXEMPLARY EMBODIMENTS

Figure 1:
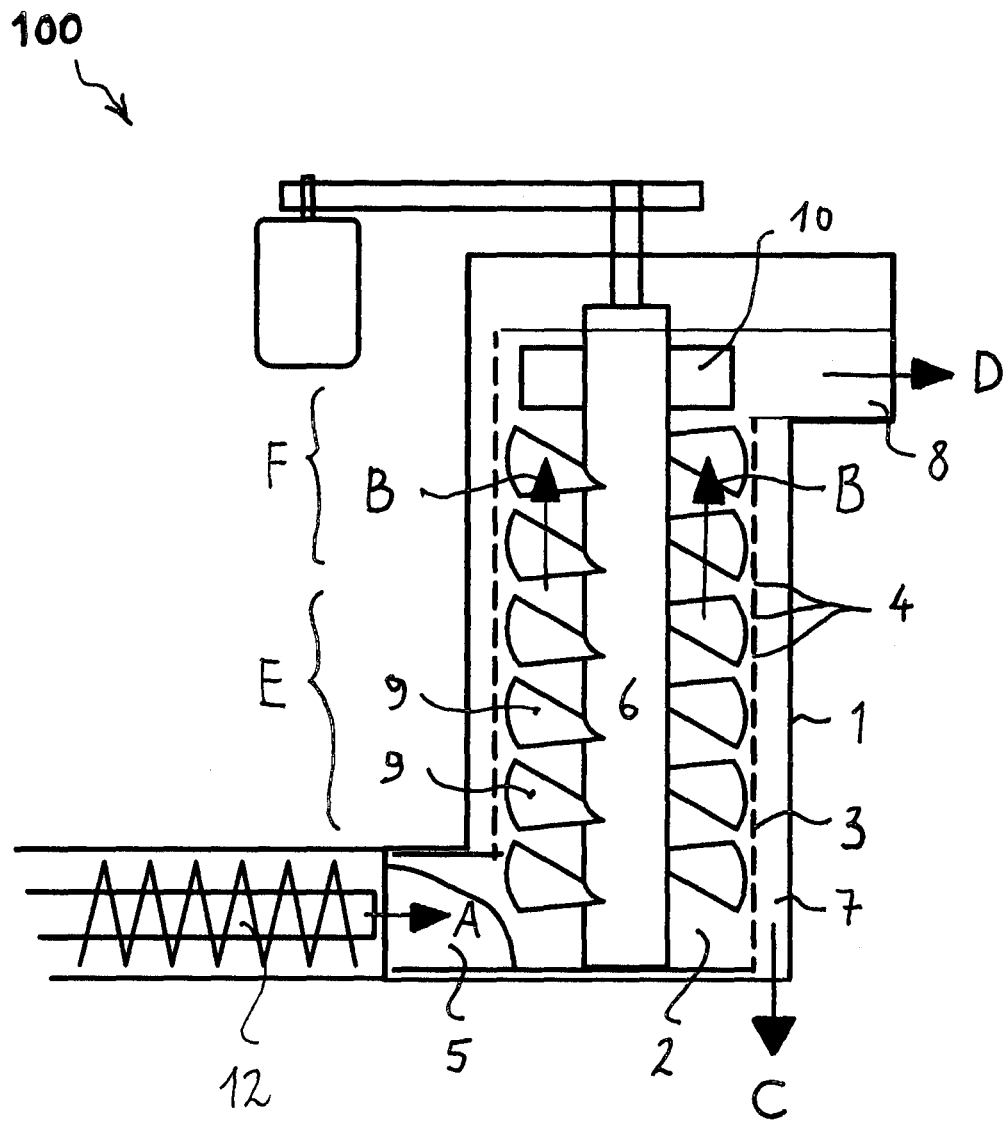
FIG. 1 shows a cross-section of a first embodiment of a device according to the invention.

The device (100) shown in FIG. 1 comprises a cylindrical housing (1) having therein a cylindrical chamber (2), the wall (3) of which is provided with perforations (4) with a diameter of for instance 5 mm, and a feed opening (5) for infeed (A) of a mixture of particles of organic material and particles of plastic foil to be separated. The material has earlier been pressed through a screen with openings of a diameter of for instance 8 mm (not shown). Softer organic material is comminuted here to particles of organic material. The particles of plastic foil have also passed through the screen here. In the given example the mixture for separating is introduced (A) by means of an auger or worm screw (12). Device (100) further comprises a first discharge opening (7) for discharging (C) separated particles of organic material and a second discharge opening (8) for discharging (D) separated particles of plastic foil. Placed in chamber (2) is a rotor (6) which can bring about a great centrifugal acceleration, for instance 150 to 200 times the acceleration of gravitational force, in the vicinity of the wall at a rotation speed of for instance 500 to 1000 revolutions per minute. Rotor (6) comprises a number of first blades (9) lying obliquely of the rotation axis of rotor (6) and a number of second blades (10) which are located in the vicinity of second discharge opening (8) and are parallel to the rotation axis of rotor (6). Second discharge opening (8) is placed tangentially relative to rotor (6), in this case second blades (10).

In accordance with a method according to the invention the mixture of particles of plastic foil and particles of organic material to be separated is introduced (A) into chamber (2) through feed opening (5) by means of auger (12). Inside chamber (2) the mixture is set into a rapid rotating movement by rotor (6), in this case first blades (9). First blades (9) lie obliquely of the rotation axis of rotor (6) such that a first airflow (B) is generated inside chamber (2) parallel to the rotation axis of rotor (6) with a speed of for instance 15 m/s at a flow rate of for instance 4000 m³/h. The heavier particles of organic material are flung outward perpendicularly of the rotation axis of rotor (6) by the rotating movement and discharged through perforations (4) to first discharge opening (7). The particles of organic material will partially deform here during passage through perforations (4). The lighter particles of plastic foil are carried along by first airflow (B) parallel to the rotation axis of rotor (6) to second discharge opening (8) and there blown out (D). Blowing out (D) is enhanced by a second airflow which is generated by the second blades (10) and which hereby also enhances the totality of airflows (B-D). It is found in practice that the heavier particles of organic material are flung outward through perforations (4) mainly in a first part (E) of chamber (2). Air which entrains (B) the lighter particles of plastic foil is mainly drawn into the chamber through perforations (4) in a second part (F) of chamber (2).

Advantageous is that rotor (6), in addition to generating the rotating movement, also generates the first airflow (B) and the second airflow (D). This makes the device less complex, less expensive, less susceptible to malfunction and requiring less maintenance, since separate fans are thus not necessary. For a good separation of a given mixture parameters such as feed flow rate, centrifugal acceleration and airflow velocities will of course have to be correctly adjusted to each other.

Figure 2:
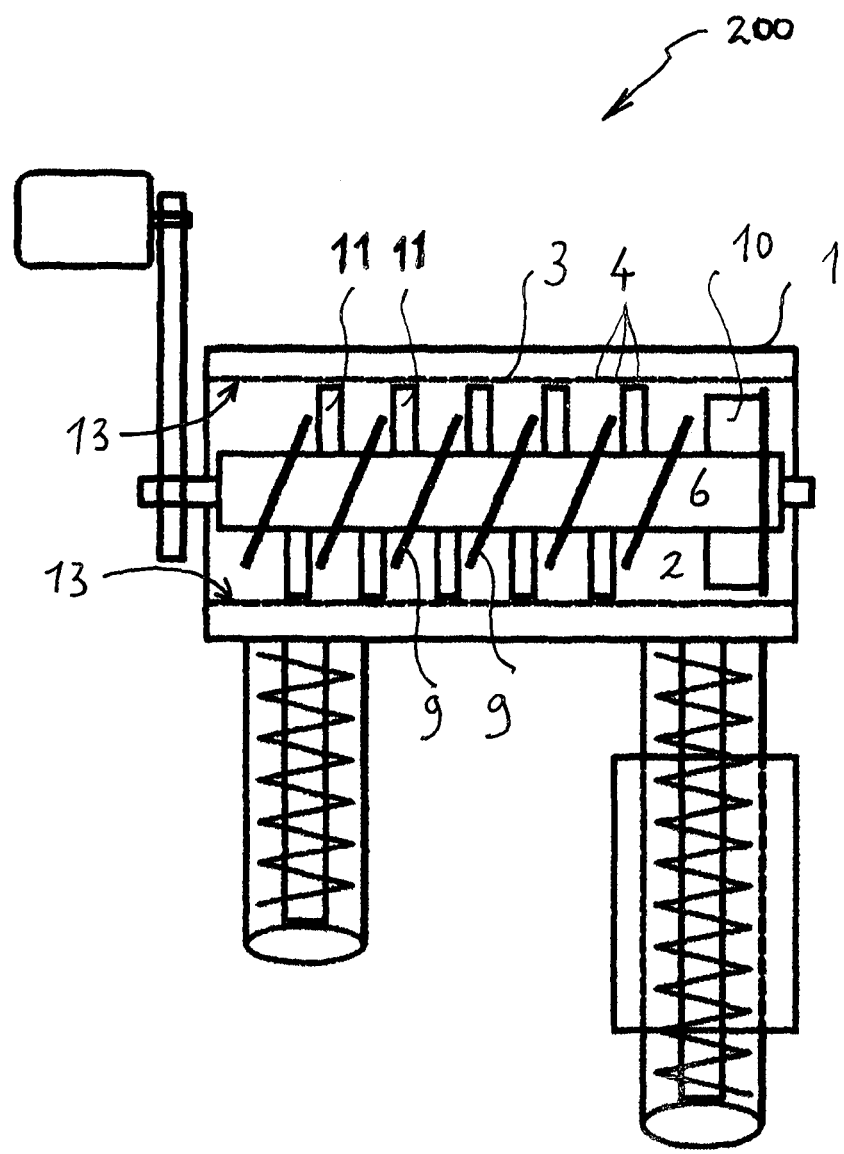
FIG. 2 shows a cross-section of a second embodiment of a device according to the invention.

Device (200) shown in FIG. 2 again comprises a cylindrical housing (1) having therein a cylindrical chamber (2), the wall (3) of which is again provided with perforations (4), and a rotor (6). The position of rotor (6) is now however not vertical but horizontal. This is possible because the influence of gravitational force is negligible in relation to the relatively high centrifugal accelerations and air velocities. This can be favourable for instance in respect of the space taken up and the lower height of the device.

Device (200) also comprises a number of third blades (11) forming part of rotor (6) for the purpose of removing material present on the inner side (13) of wall (3) of chamber (2). The outer ends of third blades (11) are situated for this purpose in the vicinity of this inner side (13). Material possibly accumulating on this inner side (13), in particular between first blades (9), can thus be removed from this inner side.

With a method and device according to the invention it is possible to realize a very good separation, with for instance a percentage of plastic foil of less than 0.1% in the remaining organic fraction, this being a considerable improvement on results achieved with known methods and devices.

It will be apparent that the invention is not limited to the shown and described exemplary embodiments but that diverse variants which will be obvious to a skilled person are possible within the scope of the invention. In addition to being used for mutual separation of particles of plastic foil and particles of organic material, the invention can thus also be applied for mutual separation of other types of lighter and heavier particles. Infeed can also take place other than by means of an auger or worm screw, for instance by simply making use of gravitational force.

The invention claimed is:

1. A method for mutually separating particles of plastic foil and particles of organic material, the method comprising steps of:
    arranging perforations in a wall of a chamber;
    pressing household waste through a screen at a pressure sufficient to break cell walls thereby producing a mixture comprising organic material and particles of plastic foil;
    feeding the mixture into the chamber through a feed opening provided for the purpose;
    setting the introduced mixture into a rotating movement inside the chamber by means of a rotor such that in the vicinity of the perforations the centrifugal force to which a particle is subjected is at least fifty times greater than the gravitational force to which the particle is subjected;
    generating a first airflow in the chamber parallel to the rotation axis of the rotor;
    discharging through a first discharge opening particles of organic material which have left chamber through the perforations; and
    discharging through a second discharge opening particles of plastic foil carried along by the first airflow.

2. The method of claim 1, wherein perforations with a cross-section smaller than the average cross-section of the particles of foil are arranged in the wall.

3. The method of claim 1, wherein the first airflow is generated such that in the vicinity of the perforations a force to which a particle of plastic foil is subjected as a result of the first airflow is greater than a centrifugal force to which the particle of plastic foil is subjected.

4. The method of claim 1, wherein the first airflow is generated by the rotor.

5. The method of claim 1, wherein the discharge through the second discharge opening of particles of plastic foil carried along by the first airflow takes place at least partially by means of a second airflow.

6. The method of claim 5, wherein the second airflow is generated by the rotor.

7. A device for mutually separating particles of plastic foil and particles of organic material, the device comprising:
- a housing;
- a chamber which is situated inside the housing and a wall of which is provided with perforations;
- a feed opening for feeding a mixture comprising particles of plastic foil and particles of organic material into the chamber;
- a rotor placed in the chamber and suitable for setting the introduced mixture into a rotating movement such that in the vicinity of the perforations the centrifugal force to which a particle is subjected is at least fifty times greater than the gravitational force to which the particle is subjected;
- a plurality of first blades which form part of the rotor wherein the first blades lie obliquely to the rotation axis of the rotor so as to be suitable for generating a first airflow of air drawn in through the perforations in the chamber and flowing in the chamber parallel to the rotation axis of the rotor;
- a first discharge opening for discharging particles of organic material which have left the chamber through the perforations; and
- a second discharge opening for discharging particles of plastic foil carried along by the first airflow;
- a plurality of second blades which form part of the rotor wherein the second blades lie parallel to the rotation axis of the rotor so as to be suitable for generating a second airflow out through the second discharge opening,
- wherein the first airflow in the chamber is in the direction from the feed opening to the second discharge opening and the first airflow and second airflow make up the totality of airflows in the chamber.

8. The device of claim 7, wherein the cross-section of the perforations is smaller than the average cross-section of the particles of foil.

9. The device of claim 7, wherein the first means are suitable for generating a large first airflow such that in the vicinity of the perforations the force to which a particle of plastic foil is subjected as a result of the first airflow is greater than the centrifugal force to which the particle of plastic foil is subjected.

10. The device of claim 7, wherein the device also comprises third means for removing material present on a side of the wall facing toward the chamber.

11. The device of claim 10, wherein the third means comprise a number of third blades which form part of the rotor and the outer ends of which are situated in the vicinity of the side of the wall facing toward the chamber.

* * * * *